March 14, 1939. G. E. POPE 2,150,186
FIBROUS FRICTION ELEMENT
Filed Sept. 16, 1936
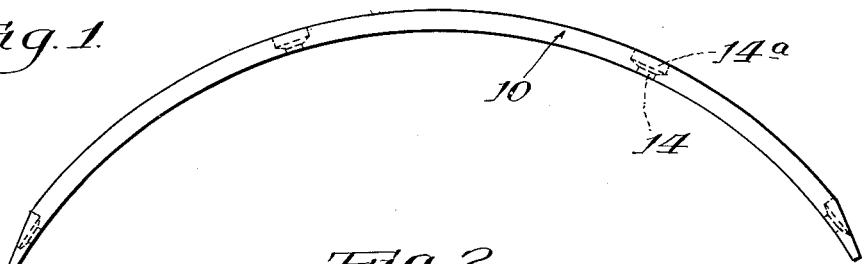
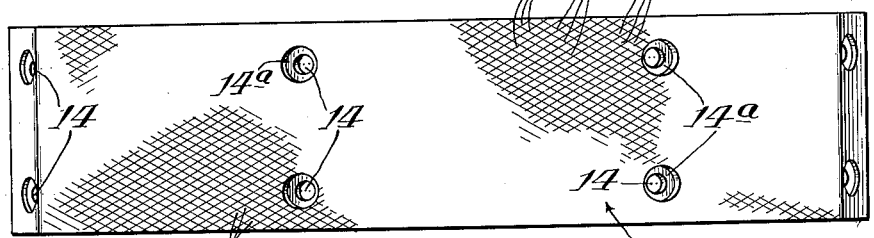
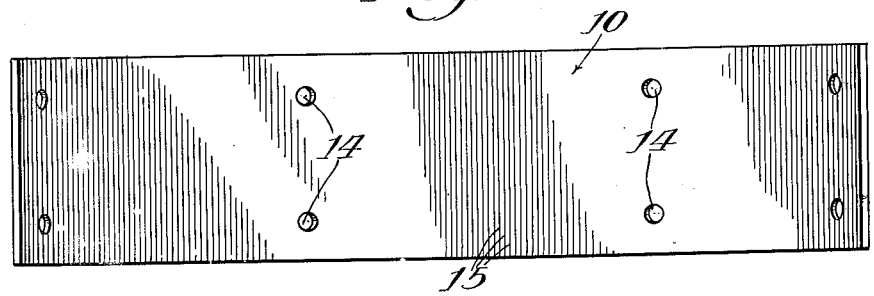
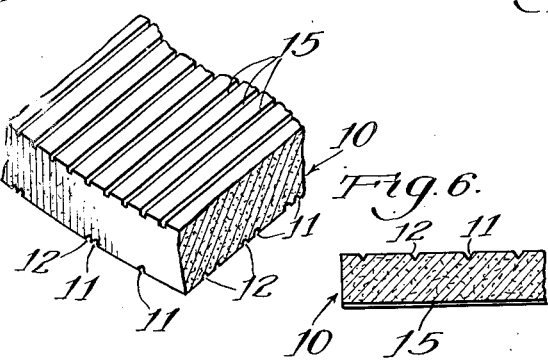
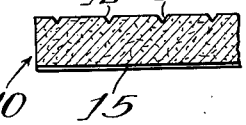
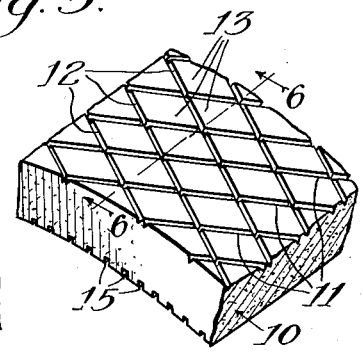
Inventor:
George E. Pope,
By: Lee J. Gary
Attorney Patented Mar. 14, 1939

2,150,186

UNITED STATES PATENT OFFICE 2,150,186

FIBROUS FRICTION ELEMENT

George E. Pope, Stratford, Conn., assignor to Raybestos-Manhattan, Inc., Bridgeport, Conn., a corporation of New Jersey Application September 16, 1936, Serial No. 101,009

6 Claims. (Cl. 188—261)

The present invention relates to friction elements such as brake linings or clutch facings, and more particularly to friction elements of this type which are composed primarily of unwoven fibrous material, treated with a binder and cured. Although it will be apparent that the present invention is equally well adaptable to clutch facings, I have for purposes of illustration shown and described my invention as specifically applied to brake lining.

It is a well recognized fact that brake lining when applied to automobiles, both in case of initial installation or in case of relining brakes of old cars, requires a substantial period of time before the lining becomes sufficiently worn in so as to make substantially complete contact throughout its entire area and thereby obtain the maximum efficiency of the lining. This difficulty is primarily due to the fact that it is almost impossible to manufacture and assemble cooperating parts of a brake mechanism with such a degree of accuracy so as to obtain substantially uniform engagement of the entire surface of the brake lining immediately upon its installation. It has also been recognized that due to present development of high speed type automobiles, the brake linings are subjected to greater stresses and wear due to both the high rate of speed of travel of the vehicle and also to the increase in heat generated in the application of the brakes. Continuous and excessive heat of the brake mechanism usually results in absorption of heat by the lining which gradually breaks it down and causes deterioration thereof at a rate more rapid than would ordinarily be encountered.

The present invention contemplates the provision of a novel and improved brake lining which is characterized by its quality of more uniform engagement with the brake drum, high durability and efficiency, and which is constructed to assist in dissipating heat and for cooling both the friction lining and the support on which it is mounted.

The friction lining embodying the present invention is further characterized by a uniformly interrupted relatively hard reinforced operating surface composed of a plurality of individual areas separated by two series of oppositely disposed channels which extend from edge to edge of the lining. This construction of the operating surface decidedly reduces the tendency to score the brake drum, because said channels serve to promptly remove from between the operating surface of the lining and the cooperating surface of the brake drum finely abraded material of either or both the lining and the drum so that said material does not become lodged upon the lining and cause scoring of the drum. The formation of the operating surface in the above manner results in causing the lining to quickly build up a proper working surface, and provides relatively uniform engagement with the brake drum and which surface is retained for substantially the entire life of the lining.

More specifically the construction for dissipating heat and cooling the friction element and its support consists in forming in the under surface of the brake lining a plurality of narrow, closely spaced channels which extend from edge to edge of the lining. This construction provides a somewhat resilient cushioning action when the lining is placed in braking operation, due to the slight compression of the lining which action temporarily reduces the effective size of the channels in the under side of the lining, causing expulsion of the air from said channels. Upon release of the braking pressure said lining tends to return to normal, causing air to be drawn into said channels on the under side of the lining, simulating in effect a "breathing action". Although the air expelled from and drawn into each channel by such action is of small volume, yet because of the great multiplicity of channels, there is a substantial cooling effect produced, which results in dissipation of a substantial amount of heat which would normally be retained for a substantial period of time by both the lining and the support on which it is mounted.

Other novel characteristics and advantages of the friction element embodying the present invention will hereafter appear in the following description, taken in connection with the accompanying drawing in which:

Fig. 1 is an edge view of a piece of brake lining embodying the present invention.

Fig. 2 is a top view, showing the operating surface of the piece of brake lining.

Fig. 3 is a view of the under side of the piece of brake lining.

Fig. 4 is an enlarged perspective view of a fragment of the lining showing the detail formation of the under surface thereof.

Fig. 5 is a view similar to Fig. 4, showing the formation of the outer or operating surface of the lining.

Fig. 6 is an enlarged fragmentary section taken at line 6—6 on Fig. 5.

As above mentioned, for purposes of illustration I have disclosed the present invention as adapted to brake lining. Brake lining for use in carrying out the present invention may be any one of the three well known unwoven types, namely, molded, sheeted or extruded. Lining of these types are usually composed mainly of fibrous material, such as asbestos, mixed with a suitable carrier, such as water, to form a mass which is then processed in one of the three above mentioned manners. After the fibrous mass is reduced to strip form, corresponding to brake lining, it may be treated with a suitable binder, as is well known and employed in the art, and is then placed in a mold and subjected to heat and/or pressure for curing and imparting a desired shape to the lining. The step of introducing the binder may be employed as taught by other well known methods employed in this art, such as for example, when this material is produced by the sheeted process the entire sheet of material may be treated with a binder or solvent, prior to severing into strips constituting the lining.

Referring now in detail to the drawing, the brake lining element is indicated generally at 10 and is shown of curved form corresponding to the final shape of the product. The exterior or convex surface of the element, which constitutes the effective operating surface of the brake lining, is provided with two series of oppositely disposed obliquely extending intersecting channels indicated at 11, 12 which extend from edge to edge of the lining. Said channels produce or define a multiplicity of relatively small individual reinforced diamond-shaped surfaces designated at 13, which initially constitute the operating surface of the lining. The concave or under side of the element is formed with a multiplicity of substantially parallel closely spaced apart channels 15 which extend from edge to edge of the lining. As shown in the drawing these channels 15 are relatively straight and extend at substantially right angles to the edges of the lining. It is to be understood that for the purposes of the present invention these channels may be other than straight as long as they extend from edge to edge of the lining, and by way of illustration said channels may be substantially V-shape, composed of two straight portions extending in angular relation to each other and terminating at the edges of the lining.

By providing the channels 11 and 12 in the exterior or operating surface of the lining in the manner indicated, results in forming said diamond-shaped areas 13 so that two contiguous sides of each of the diamond-shaped areas are disposed in approximately equally angular relation to the direction of force resulting upon placing of the brake lining in operation. This arrangement causes the diamond-shaped areas to individually serve as small plows which are moved relatively to the cooperating surface of the brake drum so as to skid off or remove from the brake drum any abraded particles of either the brake drum or the friction lining, and because of the oblique arrangement of the channels 11 and 12 said material will be caused to travel down the channels and discharge at the edges of the lining. This prompt removal of abraded material or any other foreign matter that may become lodged between the operating surface of the lining and the brake drum greatly reduces any tendency toward scoring of the drum. Furthermore, these diamond-shaped areas, because of their arrangement, result in a balancing of forces in the operation of the lining with the brake drum, as there is no tendency toward side thrust or force resulting during the braking action, as manifestly would result if a single series of parallel obliquely extending grooves were provided in the operating surface of the lining. Moreover, the multiplicity of small separated areas greatly assists and expedites the working in of the brake lining for promptly obtaining maximum braking efficiency, and when said lining is once worn down to the full working surface, said working surface is maintained substantially for the entire length of life of the lining. It will be observed that the channels 11 and 12 in the operating surface of the lining are substantially V-shaped in cross section so that the edge portions of the respective diamond-shaped areas 13 are bevelled or tapered, which further reduce the effective size of these individual areas, while also removing sharp corners or edges which would normally be formed by straight side channels, thus eliminating an excessive amount of abrading which would result by the contact of the lining with the drum.

These channels 11 and 12 also have a further advantage in that they serve to promptly remove moisture or water from either the cooperating surface of the brake drum or the lining, and as is well known when water contacts the operating surface of a brake lining, it acts as a lubricant in that it does not permit maximum braking efficiency of the lining. By virtue of this construction, when the lining is compressed during the braking action, any film of water on either the lining or the drum will be caused to flow into the channels 11 and 12 and be discharged laterally at the edges of the lining.

The brake lining is formed with a plurality of openings, 14, for accommodating rivets for securing the lining to a brake shoe or other support. The operative surface of the lining surrounding said openings is countersunk, as indicated at 14a, for receiving the heads of the rivets and to insure that said heads are disposed below the operating surface of the lining.

The grooves 15 formed in the under side of the lining which surface is disposed in contact with its support, such as the brake shoe, assists in dissipating heat from both the lining and the support on which it is mounted because these grooves or channels become slightly reduced in size by the application of the brake which results in compressing the lining as a whole, and thus results in expelling a certain amount of air from these respective channels. Manifestly when the braking pressure is released and the resiliency of the lining tends to return it to its normal condition, the size of the channels 15 increases to normal, resulting in drawing in a small quantity of air in said channels, which action in effect simulates a "breathing action" and assists in dissipating heat from both the lining and the brake shoe, as above mentioned. These channels also provide a minimum of contact between the lining and the shoe so as to reduce to a minimum the heat transfer from lining to shoe.

Because there is a tendency for the lining to move in a longitudinal direction by the force resulting from the rotation of the brake drum, when the brake is actuated, there is a tendency to shear the rivets which secure the lining to the brake shoe. In time such acting forces tends to loosen the lining on the rivets by de-forming the holes, resulting in their becoming enlarged. Now due to the increased surface area on the under side of the lining, by reason of the formation of the channels 15, said lining is capable of a limited amount of stretch which serves to relieve the rivets of excessive shearing strains. Furthermore, the edges of said channels offer additional resistance to moving of the lining on the shoe, and thereby relieves the rivets of some shearing force. Said channels 15 also render the lining slightly yielding so as to permit it to readily conform to the surface of the brake shoe.

The channels 11, 12 and 15 may be formed in the surface lining by die on a press, preferably prior to the final curing treatment. However, if desired, said channels may be cut into the surface of the lining after the final curing of the lining.

Although I have herein disclosed my invention as especially applied to brake lining, it is also capable of adaptation to clutch facings. I do not, therefore, wish to be understood as limiting this invention to brake lining.

I claim as my invention:

1. An improved friction element of fibrous material having parallel edges and characterized by a uniformly interrupted relatively hard reinforced operating surface composed of a plurality of individual areas separated by two series of oppositely disposed intersecting channels extending from edge to edge at equal angles to the edges of the friction element.

2. An improved brake lining of fibrous material having parallel edges and characterized by a uniformly interrupted relatively hard reinforced operating surface composed of a plurality of individual areas separated by two series of oppositely disposed intersecting channels extending obliquely across said lining at equal angles to the edges of the brake lining and terminating at the edges thereof.

3. An improved friction element of fibrous material having parallel edges and characterized by a uniformly interrupted relatively hard reinforced operating surface composed of a plurality of individual diamond-shaped areas separated by two series of oppositely disposed intersecting channels extending from edge to edge, at equal angles to the edges of the friction element, said channels being so located that the diamond-shaped areas are disposed with two contiguous sides in approximately equi-angular relation to the general direction of force when said element is placed in operation.

4. An improved brake lining of non-woven fibrous material having parallel edges and characterized by a uniformly interrupted relatively hard reinforced operating surface composed of a plurality of individual diamond-shaped areas separated by two series of oppositely disposed intersecting channels extending at equal angles to the edges of the brake lining obliquely across said lining from edge to edge, the acute angular portions of said diamond shaped areas extending in the general direction of force when said lining is placed in operation.

5. An improved brake lining of fibrous material characterized by a uniformly interrupted relatively hard reinforced operating surface composed of a plurality of individual areas separated by two series of oppositely disposed intersecting channels extending cross-wise of said lining and terminating at the edges thereof, the supporting surface of said lining being formed with a plurality of closely spaced substantially parallel channels extending from edge to edge.

6. An improved brake lining of non-woven fibrous material characterized by a uniformly interrupted relatively hard reinforced operating surface composed of a plurality of individual diamond-shaped areas separated by two series of oppositely disposed intersecting channels extending obliquely across said lining from edge to edge, the supporting surface of said lining being formed with a plurality of closely spaced substantially parallel channels extending from edge to edge.

GEORGE E. POPE.